United States Patent
Bocking et al.

(10) Patent No.: US 7,161,496 B2
(45) Date of Patent: Jan. 9, 2007

(54) SINGLE POINT NOTIFICATION FOR A MOBILE DEVICE

(75) Inventors: Andrew D. Bocking, Waterloo (CA);
Ronald Scotte Zinn, Waterloo (CA);
Mihal Lazaridis, Waterloo (CA);
Harry R. Major, Waterloo (CA);
Darin Andrew White, Waterloo (CA)

(73) Assignee: Research In Motion Limited, Waterloo (CA)

( * ) Notice: Subject to any disclaimer, the term of this patent is extended or adjusted under 35 U.S.C. 154(b) by 221 days.

(21) Appl. No.: 10/957,658

(22) Filed: Oct. 5, 2004

(65) Prior Publication Data

US 2006/0073855 A1  Apr. 6, 2006

(51) Int. Cl.
*H04M 1/663* (2006.01)
*H04M 1/725* (2006.01)
*H04Q 7/22* (2006.01)
*H04Q 7/00* (2006.01)
*G08B 1/08* (2006.01)

(52) U.S. Cl. .......................... 340/815.45; 340/539.11; 455/412.2

(58) Field of Classification Search ........... 340/815.45, 340/539.1–539.32; 455/412.2, 567, 412.1, 455/413, 556.2, 566; 370/313
See application file for complete search history.

(56) References Cited

U.S. PATENT DOCUMENTS 6,385,466 B1* 5/2002 Hirai et al. ............... 455/566
6,438,390 B1* 8/2002 Awan ....................... 455/566
6,441,721 B1* 8/2002 Tajima et al. ........... 340/286.01
6,751,484 B1* 6/2004 Sandelius et al. ........... 455/566
6,762,740 B1* 7/2004 Kimura ..................... 345/102
6,807,433 B1* 10/2004 Oota et al. ................. 455/566
2004/0198382 A1* 10/2004 Wong ...................... 455/456.1
2004/0204139 A1* 10/2004 Fujiki et al. ............... 455/566
2004/0242203 A1* 12/2004 Lipsanen et al. ......... 455/412.1

OTHER PUBLICATIONS

O2 (UK) Limited, Xda IIi Quick Start Guide, Oct. 2004 O2 (UK) Limited. Retrieved May 4, 2005 from http://www.my-xda.com/dowloads/xda_IIi_User_Guide.pdf.
HP IPAQ h6315 Pocket PC-Phone Edition, retrieved from May 4, 2005 from http://hpshopping.speedera.net/www.shopping.hp.com/shopping/data_sheet/fa239a.html.
News: Review: The Xda II from O2—Part I- Hardware, retrieved May 4, 2005, from http://tekguru.co.uk/phpBB2/index.php?article+429.
palmOne, Inc.. Using Your Treo: Includes setup information and instructions for most task, 2004.

* cited by examiner

*Primary Examiner*—Daniel Wu
*Assistant Examiner*—Jennifer Mehmood

(57) ABSTRACT

A handheld communication device includes a single notification element, which may be, for instance, a plurality of light emitting diodes packaged together, and a microprocessor for controlling the single notification element such that the single notification element presents a temporal color pattern to indicate a state of the handheld communication device.

20 Claims, 2 Drawing Sheets

| STATE | POWER STATUS | GSM STATUS | BATTERY STATUS | BLUETOOTH STATUS | NOTIFY STATUS | GREEN | RED | AMBER | BLUE |
|---|---|---|---|---|---|---|---|---|---|
| 1 | ON | IN GSM | OK | CONNECTED | NOTIFY | OFF | FLASH | OFF | FLASH |
| 2 | ON | IN GSM | OK | CONNECTED | CLEAR | OFF | OFF | OFF | FLASH |
| 3 | ON | IN GSM | OK | NOT CONN. | NOTIFY | OFF | FLASH | OFF | OFF |
| 4 | ON | IN GSM | OK | NOT CONN. | CLEAR | FLASH | OFF | OFF | OFF |
| 5 | ON | IN GSM | LOW | CONNECTED | NOTIFY | OFF | FLASH | FLASH | FLASH |
| 6 | ON | IN GSM | LOW | CONNECTED | CLEAR | OFF | OFF | FLASH | FLASH |
| 7 | ON | IN GSM | LOW | NOT CONN. | NOTIFY | OFF | FLASH | FLASH | OFF |
| 8 | ON | IN GSM | LOW | NOT CONN. | CLEAR | OFF | OFF | FLASH | OFF |
| 9 | ON | OUT OF GSM | OK | CONNECTED | NOTIFY | OFF | FLASH | OFF | FLASH |
| 10 | ON | OUT OF GSM | OK | CONNECTED | CLEAR | OFF | OFF | OFF | FLASH |
| 11 | ON | OUT OF GSM | OK | NOT CONN. | NOTIFY | OFF | FLASH | OFF | OFF |
| 12 | ON | OUT OF GSM | OK | NOT CONN. | CLEAR | OFF | OFF | OFF | OFF |
| 13 | ON | OUT OF GSM | LOW | CONNECTED | NOTIFY | OFF | FLASH | FLASH | FLASH |
| 14 | ON | OUT OF GSM | LOW | CONNECTED | CLEAR | OFF | OFF | FLASH | FLASH |
| 15 | ON | OUT OF GSM | LOW | NOT CONN. | NOTIFY | OFF | FLASH | FLASH | OFF |
| 16 | ON | OUT OF GSM | LOW | NOT CONN. | CLEAR | OFF | OFF | FLASH | OFF |
| 17 | OFF AND CHARGING | N/A | N/A | N/A | N/A | OFF | OFF | FLASH | OFF |
| 18 | OFF AND CHARGED | N/A | N/A | N/A | N/A | ON | OFF | OFF | OFF |
| 19 | OFF | N/A | N/A | N/A | N/A | OFF | OFF | OFF | OFF |

FIG. 2

SINGLE POINT NOTIFICATION FOR A MOBILE DEVICE

FIELD OF THE INVENTION

The present invention relates to notification for mobile communications devices and, more particularly, to a single point of notification for such devices.

BACKGROUND

As mobile communication devices gain increasing functionality, a device that was once merely a mobile wireless telephone becomes a "converged device" on which one may send and receive e-mail and other messages, maintain a list of contacts, maintain a schedule of meetings and events, maintain an organized list of tasks, etc.

Such converged devices often have colorful display screens on which the information related to the various functions of the device may be reviewed and manipulated. It has long been known that such display screens are a particularly large drain on battery resources and that it is important to minimize draining battery resources for mobile devices. However, it has been necessary, in many cases, to power on the display screen to receive very small units of information, for instance, notification that a new e-mail message has been received. To convey such small units of information, user interface designers for such converged devices have added light emitting diodes (LED) to the devices. For instance, a green flashing LED on the front of a converged device may serve to indicate to a user of the device that the device is in communication with a base station for a wireless cellular telecommunication system. Additionally, a second green flashing LED on the front of the converged device may serve to indicate to a user of the device that the device is in communication with a base station for proximate wireless local area network (i.e., a WiFi LAN).

Several known converged devices have multiple LEDs, illumination of each being used to convey some unit of information. However, the LEDs are not always well placed for ease in assessing the status of the device. For instance, the LEDs may not be visible to the user until removed from a carrying case. Furthermore multiple LEDs may lead to confusion as to which LED conveys what particular unit of information.

SUMMARY

A single notification point on a mobile communication device may be used to convey a variety of units of information based on the color of the notification point. Advantageously, the single notification point may be placed on the top of the device to quickly convey information to a user without the user being required to remove the device from a carrying case (provided that the carrying case has an open top). Additionally, by consolidating multiple notification points to a single notification point, only colors and a temporal pattern of the colors can be used to convey information, thereby providing for a simpler system to be learned by the user.

In accordance with an aspect of the present invention there is provided a handheld communication device. The handheld communication device includes a battery, a single notification element and a microprocessor. The microprocessor is for controlling the single notification element such that, under control of the microprocessor, the single notification element: indicates a first color to alert a user of the handheld communication device of a proximate wireless communication connection engaged with another device using a predetermined protocol; indicates a second color to alert the user of a distant wireless communication connection established with a base station; indicates a third color to alert the user of a received message; and indicates a fourth color to alert the user of a low charge on the battery.

In accordance with another aspect of the present invention there is provided a method of managing a single notification element of a handheld communication device. The method includes controlling the single notification element to indicate a first color to alert a user of the handheld communication device that the handheld communication device is engaged in a proximate wireless communication connection with another device using a predetermined protocol, controlling the single notification element to indicate a second color to alert the user that the handheld communication device has established a distant wireless communication connection with a base station, controlling the single notification element to indicate a third color to alert the user that the handheld communication device has received a message and controlling the single notification element to indicate a fourth color to alert the user that a battery of the handheld communication device holds a charge below a predetermined threshold. In a further aspect of the present invention, a computer readable medium is provided for adapting a handheld communication device to carry out this method.

In accordance with a further aspect of the present invention there is provided a handheld communication device. The handheld communication device includes a single notification element and a microprocessor for controlling the single notification element such that the single notification element indicates a temporal color pattern selected from at least ten temporal color patterns, where each of the temporal color patterns corresponds to a state of the handheld communication device.

In accordance with an aspect of the present invention there is provided a handheld communication device. The handheld communication device includes a battery, a single notification element and a microprocessor. The microprocessor is for controlling the single notification element such that, under control of the microprocessor, the single notification element: indicates a first temporal color pattern to alert a user of the handheld communication device of a proximate wireless communication connection engaged with another device using a predetermined protocol; indicates a second temporal color pattern to alert the user of a distant wireless communication connection established with a base station; indicates a third temporal color pattern to alert the user of a received message; and indicates a fourth temporal color pattern to alert the user of a low charge on the battery.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention:

FIG. 2 illustrates an exemplary state table for the single notification point of FIG. 1.

DETAILED DESCRIPTION

Figure 1:
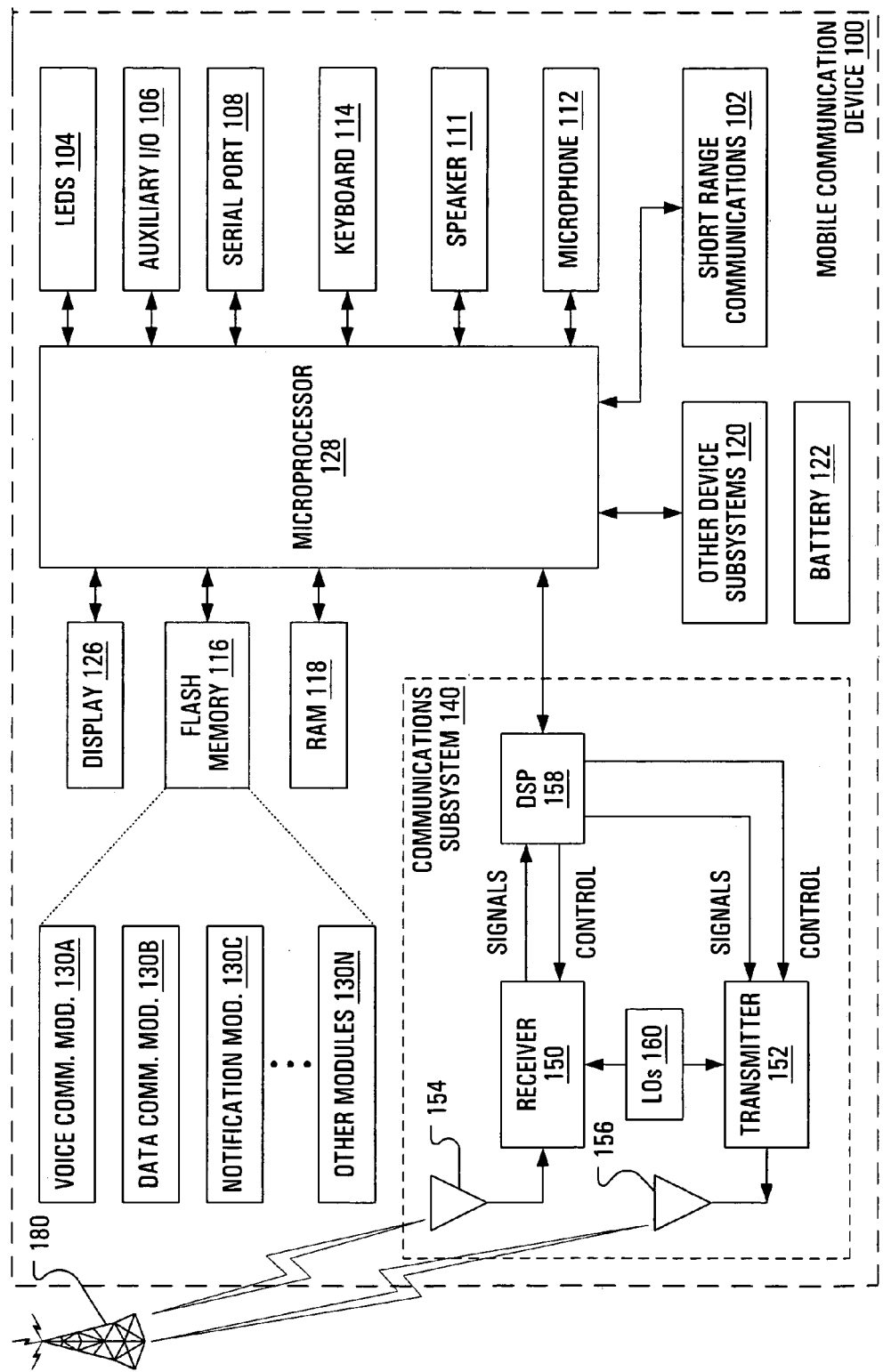
FIG. 1 illustrates components of an exemplary mobile data communication device including a single notification point according to an embodiment of the present invention.

FIG. 1 illustrates a handheld mobile communication device 100 including a housing, an input device (a keyboard 114), and an output device (a display 126), which is preferably a full graphic or full color Liquid Crystal Display (LCD). Other types of output devices may alternatively be utilized. A processing device (a microprocessor 128) is shown schematically in FIG. 1 as coupled between the keyboard 114 and the display 126. The microprocessor 128 controls the operation of the display 126, as well as the overall operation of the mobile device 100, in response to actuation of keys on the keyboard 114 by a user.

The housing may be elongated vertically, or may take on other sizes and shapes (including clamshell housing structures). The keyboard may include a mode selection key, or other hardware or software, for switching between text entry and telephony entry.

In addition to the microprocessor 128, other parts of the mobile device 100 are shown schematically in FIG. 1. These include: a communications subsystem 140; a short-range communications subsystem 102; the keyboard 114 and the display 126, along with other input/output devices including a set of auxiliary I/O devices 106, a serial port 108, a set of LEDs 104, a speaker 111 and a microphone 112; as well as memory devices including a flash memory 116 and a Random Access Memory (RAM) 118; a battery 122; and various other device subsystems 120. The mobile device 100 is preferably a two-way radio frequency (RF) communication device having voice and data communication capabilities. In addition, the mobile device 100 preferably has the capability to communicate with other computer systems via the Internet.

Operating system software executed by the microprocessor 128 is preferably stored in a computer readable medium, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device may also be stored to the RAM 118.

The microprocessor 128, in addition to its operating system functions, enables execution of software applications on the mobile device 100. A predetermined set of software applications that control basic device operations, such as a voice communications module 130A and a data communications module 130B, may be installed on the mobile device 100 during manufacture. A notification module 130C may also be installed on the mobile device 100 during manufacture, to implement aspects of the present invention to control the set of LEDs 104. As well, additional software modules, illustrated as an other software module 130N, which may be, for instance, a personal information manager (PIM) application, may be installed during manufacture. The PIM application is preferably capable of organizing and managing data items, such as e-mail messages, calendar events, voice mail messages, appointments, and task items. The PIM application is also preferably capable of sending and receiving data items via a wireless carrier network 180. Preferably, the data items managed by the PIM application are seamlessly integrated, synchronized and updated via the wireless carrier network 180 with the device user's corresponding data items stored or associated with a host computer system.

Communication functions, including data and voice communications, are performed through the communication subsystem 140, and possibly through the short-range communications subsystem 102. The communication subsystem 140 includes a receiver 150, a transmitter 152 and one or more antennas, illustrated as a receive antenna 154 and a transmit antenna 156. In addition, the communication subsystem 140 also includes a processing module, such as a digital signal processor (DSP) 158, and local oscillators (LOs) 160. The specific design and implementation of the communication subsystem 140 is dependent upon the communication network in which the mobile device 100 is intended to operate. For example, the communication subsystem 140 of the mobile device 100 may be designed to operate with the Mobitex™, DataTAC™ or General Packet Radio Service (GPRS) mobile data communication networks and may also be designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Other types of data and voice networks, both separate and integrated, may also be utilized with the mobile device 100.

Network access requirements vary depending upon the type of communication system. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore requires a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Subscriber Identify (IMSI) number.

When required network registration or activation procedures have been completed, the mobile device 100 may send and receive communication signals over the wireless carrier network 180. Signals received from the wireless carrier network 180 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the wireless carrier network 180 are processed (e.g., modulated and encoded) by the DSP 158 and are then provided to the transmitter 152 for digital to analog conversion, frequency up conversion, filtering, amplification and transmission to the wireless carrier network 180 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text (e.g., Short Messaging Service, or "SMS") message or web page download, is processed by the communication subsystem 140 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the wireless carrier network 180 via the communication subsystem 140.

In a voice communication mode, overall operation of the device is substantially similar to the data communication mode, except that received signals may be output to a speaker 111, and signals for transmission may be generated by a microphone 112. Alternative voice or audio I/O subsystems, such as a voice message recording subsystem, may also be implemented on the mobile device 100. In addition, the display 126 may also be utilized in voice communication mode, for example, to display the identity of a calling party, the duration of a voice call, or other voice call related information.

The short-range communications subsystem 102 enables communication between the mobile device 100 and other proximate systems or devices, which need not necessarily be similar devices. For example, the short-range communications subsystem 102 may include an infrared device and associated circuits and components, or a Bluetooth™ communication module, to provide for communication with similarly-enabled systems and devices.

In overview, a single notification element on the mobile device 100 is controlled such that the single notification element presents a temporal color pattern to indicate a state of the mobile device 100.

One of the states of the mobile device 100 relates to the mobile device 100 being within a GSM coverage area. Such a state may be detected by the microprocessor 128 through communication between the microprocessor 128 and the communications subsystem 140. Another of the states of the mobile device 100 relates to the occurrence of an event associated with the PIM application executed on the microprocessor 128. An event may include the receipt of an e-mail or SMS message and a reminder for an event scheduled in the calendar portion of the PIM application. A further one of the states of the mobile device 100 relates to a charge on the battery 122. The microprocessor 128, through a communication channel (not shown) with the battery 122 may determine a current state of charge. A comparison of the current state of charge to a predetermined threshold may result in a determination that the mobile device 100 is in a state of low battery charge. A still further one of the states of the mobile device 100 relates to the mobile device 100 being engaged in a short-range communications connection, e.g., a Bluetooth™ connection, with a paired device. Information related to such a connection may be provided to the microprocessor 128 by the short-range communications subsystem 102.

In operation, the microprocessor 128 may control the LEDs 104 according to an exemplary state table 200 as presented in FIG. 2. The exemplary state table 200 of FIG. 2 corresponds to a mobile device 100 wherein the LEDs 104 have been implemented as a tricolor LED package (red, green, blue). The single notification element, then, may be considered the tricolor LED, which is available as a three LED package with four leads; an anode corresponding to each color and a common cathode. Under control of the microprocessor 128, the tricolor LED package 104 may provide for a single notification element that may be controlled to be in multiple states including: off; red on; green on; blue on; and amber on (by combining green on and red on).

For simplicity of learning for the user, each color may be associated with only one type of status notification. In the exemplary state table 200 of FIG. 2: green is associated with notifying the user that the mobile device 100 is within a GSM coverage area, such information is expected to be provided to the microprocessor 128 by the communications subsystem 140; red is associated with notifying the user of an event associated with the PIM application executed on the microprocessor 128, such as a received e-mail message (or text message of another type), a calendar event or task due; amber is associated with notifying the user that a charge on the battery 122 is below a predetermined threshold; and blue is associated with notifying the user that the mobile device 100 is engaged in a Bluetooth™ connection with a paired device.

Furthermore, while the mobile device 100 is off, a flashing amber is associated with notifying the user of a "charging" state of the battery 122 and a solid green is associated with notifying the user of a "fully charged" state of the battery 122.

Advantageously, the tricolor LED package 104 may be exposed at the top of the mobile device 100 to quickly convey information to a user without the user being required to remove the device from a carrying case (provided that the carrying case has an open top).

The term "FLASH" as used in the exemplary state table 200 of FIG. 2 for a single status notification, such as for states numbered 2, 3, 4, 8, 10, 11, 16 and 17, may be accomplished by, for instance, activating the appropriate LED with a single status notification pattern having a ten second period. The two-state notification pattern may involve placing the LED in a first state (e.g., red on) for one second and then placing the LED in a second state (e.g., all off) for the following nine seconds.

Additionally, for a bi-status notification pattern, such as for states numbered 1, 6, 7, 9, 14 and 15, the two two-state notification patterns may be interleaved to form a three-state notification pattern. The three-state notification pattern may involve placing the LED in a first state (e.g., red on) for one second, placing the LED in a second state (e.g., blue on) for one second and then placing the LED in a third state (e.g., all off) for the following eight seconds.

Further, for a tri-status notification pattern, such as for states numbered 5 and 13, the three two-state notification patterns may be interleaved to form a four-state notification pattern. The four-state notification pattern may involve placing the LED in a first state (e.g., red on) for one second, placing the LED in a second state (e.g., green on and red on to create amber) for one second, placing the LED in a third state (e.g., blue on) for one second and then placing the LED in a fourth state (e.g., all off) for the following seven seconds.

As each of the notification patterns involves a time period during which LEDs are either on or off, it may be considered that the notification patterns may be called temporal color patterns.

Notably, the exemplary state table 200 as presented in FIG. 2 is one of many potential state tables that may be created for use in controlling the single notification element. In the exemplary state table 200, the green flashing state is only used to notify the user that the mobile device 100 is within a GSM coverage area when no other alerting conditions exist (see state 4). That is, only when the mobile device 100 is within a GSM coverage area and there is a charge on the battery 122 that is greater than the predetermined threshold, there are no PIM events outstanding and the mobile device 100 is not engaged in a Bluetooth connection with another device will the single notification element flash green according to the exemplary state table 200.

In an alternative state table, the single notification element may flash green whenever the mobile device 100 is within a GSM coverage area without regard to the state of the battery 122, the PIM or Bluetooth connections (i.e., in states 1–8). Additionally, the state table may be user configurable such that, for instance, the single notification element is prevented from flashing green.

As will be apparent to a person of ordinary skill in the art, the single notification element need not necessarily be a set of LEDs. For instance, the single notification element may be implemented as a color wheel and a window that only allows viewing of a portion of the color wheel. A display surface of the color wheel may be divided into sections and the sections may be colored. The color wheel may be arranged to be rotated (say, by microprocessor control of a small scale stepper motor) to select the section, and, therefore, the color, that shows through the window.

Furthermore, the invention is not intended to be limited to four colors of notification. Although, as will be understood by a person of ordinary skill in the art, as more colors are added to provide further alerts, the simplicity of the mechanism diminishes. Future extensions to the invention are likely only to be limited by the ability of the typical user to distinguish between colors selected for various alerts. Additionally, if multi-color LED packages are selected the single notification element, extensions to the invention may be limited by the availability of LEDs that emit different colors.

Other modifications will be apparent to those skilled in the art and, therefore, the invention is defined in the claims.

We claim:

1. A handheld communication device comprising:
    a battery;
    a single notification element;
    a microprocessor for controlling said single notification element such that, under control of said microprocessor, said single notification element:
        indicates a first color to alert a user of said handheld communication device of a proximate wireless communication connection engaged with another device using a predetermined protocol;
        indicates a second color to alert said user of a distant wireless communication connection established with a base station;
        indicates a third color to alert said user of a received message; and
        indicates a fourth color to alert said user of a low charge on said battery.

2. The handheld communication device of claim 1 wherein said single notification element is a light emitting diode package comprising:
    a first light emitting diode for emitting light of said first color;
    a second light emitting diode for emitting light of said second color; and
    a third light emitting diode for emitting light of said third color.

3. The handheld communication device of claim 2 wherein said single notification element, under control of said microprocessor, indicates said fourth color through simultaneous indication of said second color and said third color.

4. The handheld communication device of claim 1 wherein said predetermined protocol is Bluetooth.

5. The handheld communication device of claim 1 wherein said received message is an e-mail message.

6. The handheld communication device of claim 1 wherein said received message is a Short Messaging Service message.

7. The handheld communication device of claim 1 wherein, under control of said microprocessor, said single notification element further indicates said third color to alert said user of a calendar event.

8. The handheld communication device of claim 1 wherein, under control of said microprocessor and while said handheld communication device is powered off, said single notification element further indicates said fourth color to alert said user of a charging state of said battery.

9. The handheld communication device of claim 1 wherein, under control of said microprocessor and while said handheld communication device is powered off, said single notification element further indicates said second color to alert said user of a fully charged state of said battery.

10. The handheld communication device of claim 1 wherein said distant wireless communication connection is established in a Global System for Mobile Communications.

11. The handheld communication device of claim 1 wherein said distant wireless communication connection is established in a Code Division Multiple Access network.

12. The handheld communication device of claim 1 wherein said first color is blue.

13. The handheld communication device of claim 1 wherein said second color is green.

14. The handheld communication device of claim 1 wherein said third color is red.

15. The handheld communication device of claim 1 wherein said fourth color is amber.

16. A method of managing a single notification element of a handheld communication device comprising:
    controlling said single notification element to indicate a first color to alert a user of said handheld communication device that said handheld communication device is engaged in a proximate wireless communication connection with another device using a predetermined protocol;
    controlling said single notification element to indicate a second color to alert said user that said handheld communication device has established a distant wireless communication connection with a base station;
    controlling said single notification element to indicate a third color to alert said user that said handheld communication device has received a message; and
    controlling said single notification element to indicate a fourth color to alert said user that a battery of said handheld communication device holds a charge below a predetermined threshold.

17. A computer readable medium containing computer-executable instructions that, when performed by processor in a handheld communication device having a single notification element, cause said processor to:
    control said single notification element to indicate a first color to alert a user of said handheld communication device that said handheld communication device is engaged in a proximate wireless communication connection with another device using a predetermined protocol;
    control said single notification element to indicate a second color to alert said user that said handheld communication device has established a distant wireless communication connection with a base station;

control said single notification element to indicate a third color to alert said user that said handheld communication device has received a message; and control said single notification element to indicate a fourth color to alert said user that a battery of said handheld communication device holds a charge below a predetermined threshold.

18. A handheld communication device comprising:
a battery;
a single notification element;
a microprocessor for controlling said single notification element such that, under control of said microprocessor, said single notification element:
  indicates a first temporal color pattern to alert a user of said handheld communication device of a proximate wireless communication connection engaged with another device using a predetermined protocol;
  indicates a second temporal color pattern to alert said user of a distant wireless communication connection established with a base station;
  indicates a third temporal color pattern to alert said user of a received message; and
  indicates a fourth temporal color pattern to alert said user of a low charge on said battery.

19. A handheld communication device comprising:
a battery;
a single notification element;
a microprocessor for controlling said single notification element to:
  indicate a first color when said device is in a first state wherein there is a proximate wireless communication connection engaged with another device using a predetermined protocol,
  indicate a second color when said device is in a second state wherein there is a distant wireless communication connection established with a base station;
  indicate a third color when said device is in a third state wherein a message has been received;
  indicate a fourth color when said device is in a fourth state wherein a charge on said battery is low;
  indicate an interleaved repeating pattern of said first color, said second color, and said third color when said device is in a state which is a combination of said first state, said second state, and said third state.

20. The device of claim 19 wherein said microprocessor is also for controlling said single notification element to indicate an interleaved repeating pattern of said first color, said second color, said third color, and said fourth color when said device is in a state which is a combination of said first state, said second state, said third state, and said fourth state.

* * * * *